Oct. 25, 1938.  L. SEYVERTSEN  2,134,153
GEAR PUMP
Filed Feb. 5, 1936
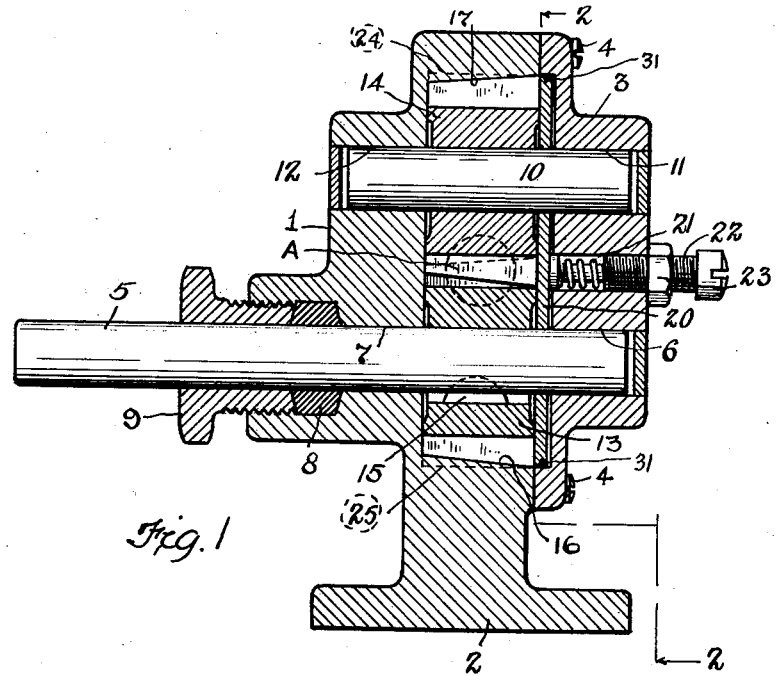
Fig. 1
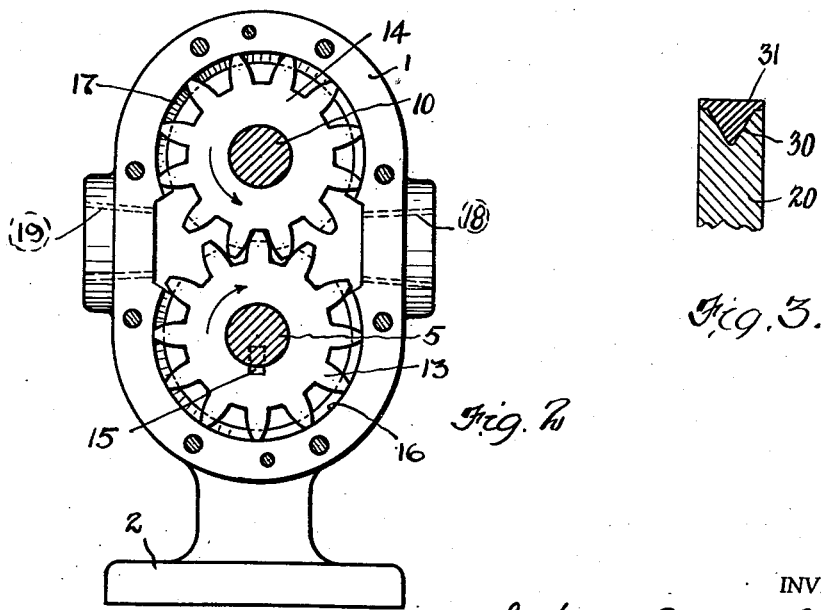
Fig. 2.
Fig. 3.
INVENTOR.
Ludwig Seyvertsen
BY
Fay, Oberlin & Fay
ATTORNEYS.

Patented Oct. 25, 1938

2,134,153

UNITED STATES PATENT OFFICE 2,134,153

GEAR PUMP

Ludwig Seyvertsen, Cleveland, Ohio, assignor of one-half to S. H. Johnston, Cleveland, Ohio Application February 5, 1936, Serial No. 62,497

4 Claims. (Cl. 103—126)

The present invention relates to a novel form of construction for fluid gear pumps in which the moving, contacting elements are so designed as to compensate for wear and deterioration. My invention also contemplates a disclosure of a method for reclaiming old worn out ordinary type of gear pumps in order that they might be restored to use and possess the properties of a wear-compensating pump. It is a further object of the invention to provide means for regulating the amount of fluid pressure generated by a gear pump. To the accomplishment of the foregoing and related ends, said invention, then, consists of the means hereinafter fully described and particularly pointed out in the claims.

The annexed drawing and the following description set forth in detail one approved method of carrying out the invention, such disclosed method however, constituting but one of the various ways in which the principle of the invention may be used.

In said annexed drawing:

Fig. 1 is a half sectioned elevational view of a gear pump constructed according to the principle of my invention; Fig. 2 is a plan view taken upon a plane normal to that of Fig. 1 and substantially along the line 2—2 thereof; and Fig. 3 is an enlarged, fragmentary sectional view of the edge portion of the plate bearing against the radial faces of the pump gears.

Now referring more particularly to the drawing, the gear pump shown therein consists of a housing member indicated generally by the numeral 1 having the base 2 and removable cover plate 3. The cover plate 3 is retained in position upon the housing by means of suitable fastening studs 4. A drive shaft 5 is journaled in the bearing 7 in the housing 1 and bearing 6 in the end plate 3. A packing 8, retained in place by the bushing 9 serves as a sealing gland around the drive shaft 5. A second shaft 10 parallel to the drive shaft 5 is carried by the bearings 11 and 12 in the end plate 3 and housing 1, respectively. The shafts 5 and 10 in turn carry the tapered or conical intermeshing gears 13 and 14. The gear 13 may be keyed to the shaft 5 by means of a suitable Woodruff key 15. The peripheral surfaces of the gears 13 and 14 contact with the conical interior walls 16 and 17 respectively in the pump housing 1. An intake opening 18 and an outlet opening 19 communicate with the interior pump chamber. Hence, the rotation of the gears in a direction indicated by the arrows in Fig. 2 will have the effect of inducing a fluid through the inlet 18, carrying such fluid around between the interstices of the gear teeth and forcing it out through the outlet 19. A plate 20 overlies the larger radial surfaces of the gears 13 and 14 and is urged against them by means of the coil spring 21 mounted on the end of the adjustable screw 22. A lock nut 23 may be provided upon the screw 22 in order to fix the latter in its desired position. As shown in Fig. 3, the peripheral edge of the plate 20 has a V-shaped groove 30 in which there is mounted a packing material 31. The packing 31 serves as a means effecting a better seal between the edge of the plate 20 and the inner walls 16 and 17 of the housing 1.

A review of the foregoing structure will reveal the fact that as wear occurs between the peripheral surfaces of the gears 13 and 14 and the inner walls 16 and 17 respectively of the pump housing, that the end plate 20 will axially displace the gears to compensate for resultant wear. It should be further noted that at the intermeshing point of the gear teeth indicated by the reference numeral A, that although such gears are carried upon parallel axes, nevertheless an efficient fluid seal is provided because at all times there is an overlapping of the mutually contacting gear teeth. In other words, it is not necessary that the tips of the gear teeth contact throughout their entire axial length with the bases of the oppositely disposed gear teeth.

When it is desired that the fluid pressure delivered by the pump be decreased or regulated to any extent, it is merely necessary to lessen the compression of the coil spring 21 by means of adjustment of the screw 22, so that the backing plate 20 will permit a leakage or by-pass effect around the radial faces of the gears 13 and 14.

In my method of reclaiming worn out gear pumps of ordinary design, the procedure is as follows: The interior chamber of an ordinary gear pump is rectangular, as indicated by the dotted lines 24 and 25 in Fig. 1, and the gears of course have a rectangular cross-section in order to conform with such shaped chamber walls; when the effects of wear and deterioration have become so great between the peripheral surfaces of such rectangularly shaped gears and their contiguous chamber walls, the gears are removed and the interior walls of the pump chamber are built up by means of the depositing of additional metal and then machined to a conical or tapered form represented by the reference numerals 16 and 17; the gears are also machined or ground to a conical form in order to interfit with the thusly formed pump chamber walls. By virtue of such a process, a worn out and useless gear pump may be thus restored to operation, with a resultant period of usage rendered possible which is as great or greater than that of the original pump.

It should also be noted that the diameter of the tapped hole in which the adjustable screw 22 engages in larger than the diameter of the coil spring, so that the latter may be easily installed and removed through the wall of the cover plate 3 without disturbing the remainder of the assembly.

Other modes of applying the principle of my invention may be employed instead of the one explained, change being made as regards the process herein disclosed, provided the step or steps stated by any of the following claims or the equivalent of such stated step or steps be employed.

I therefore particularly point out and distinctly claim as my invention:

1. In a gear pump, the combination of a housing member, axially parallel shafts journaled in said housing member, spur gears having conical teeth edge surfaces carried by said shafts and mutually interengaging, and interior walls in said housing adapted to contact the peripheral surface of said gears, a plate bearing against the larger radial faces of said gears, and means for urging said plate in an axial direction with respect to said gears.

2. In a gear pump, the combination of a housing member, axially parallel shafts journaled in said housing member, spur gears having conical teeth edge surfaces carried by said shafts and mutually interengaging, interior walls in said housing adapted to contact the peripheral surface of said gears, a plate bearing against the larger radial faces of said gears, means for urging said plate in an axial direction with respect to said gears, and an adjustable tension spring means positioned between said plate and said housing for urging said plate in an axial direction with respect to said gears.

3. In a gear pump, the combination of a housing member, axially parallel shafts journaled in said housing member, spur gears having conical teeth edge surfaces carried by said shafts and mutually interengaging, interior walls in said housing adapted to contact the peripheral surface of said gears, a plate overlying the radial faces of said gears and adjustable means for varying the axial position of said plate with respect to said gears.

4. In a gear pump, the combination of a housing member, axially parallel shafts journaled in said housing member, spur gears having conical teeth edge surfaces carried by said shafts and mutually interengaging, interior walls in said housing adapted to contact the peripheral surface of said gears, a plate bearing against the larger radial faces of said gears, a set screw mounted in said housing and extending exteriorly thereof, and a spring positioned between the end of said screw and said plate.

LUDWIG SEYVERTSEN.